US005384954A

United States Patent [19]

Grabbe

[11] Patent Number: 5,384,954

[45] Date of Patent: Jan. 31, 1995

[54] METHOD OF MANUFACTURE OF A CONTACT GUIDE

[75] Inventor: Dimitry G. Grabbe, Middletown, Pa.

[73] Assignee: The Whitaker Corporation, Wilmington, Del.

[21] Appl. No.: 184,412

[22] Filed: Jan. 19, 1994

Related U.S. Application Data

[60] Continuation of Ser. No. 42,962, Apr. 5, 1993, abandoned, which is a division of Ser. No. 833,284, Feb. 10, 1992, Pat. No. 5,252,079.

[51] Int. Cl.[6] ........................ H01R 43/20; B23P 19/00

[52] U.S. Cl. ........................................ 29/876; 29/837; 29/884; 29/417; 29/DIG. 19; 29/741; 83/878; 125/13.01

[58] Field of Search ................. 29/874, 884, 412, 832, 29/829, 834, 837, 759, 760, 876, DIG. 19; 439/71; 51/283 R, 326, 327; 83/876, 878; 125/13.01

[56] References Cited

U.S. PATENT DOCUMENTS

| | | | |
|---|---|---|---|
| 3,059,210 | 10/1962 | Luenberger | 339/94 |
| 3,951,491 | 4/1976 | Mysiak | 339/17 CF |
| 4,227,348 | 10/1980 | Demers | 51/283 R |
| 4,417,296 | 11/1983 | Schelhorn | 29/832 X |
| 4,536,955 | 8/1985 | Gudgeon | 29/840 |
| 4,569,326 | 2/1986 | Tanizaki et al. | 125/13.01 |
| 4,628,597 | 12/1986 | Meehan et al. | 29/884 |
| 4,646,435 | 3/1987 | Grassauer | 29/759 X |
| 4,690,646 | 9/1987 | Sibata | 439/71 |
| 4,699,593 | 10/1987 | Grabbe et al. | 439/71 |
| 4,722,130 | 2/1988 | Kimura et al. | 51/283 R X |
| 4,723,230 | 2/1988 | Chelminski | 367/20 |
| 4,793,101 | 12/1988 | Dlouhy et al. | 51/327 X |
| 4,839,996 | 6/1989 | Sekiya | 51/283 R X |

*Primary Examiner*—Timothy V. Eley
*Assistant Examiner*—Khan V. Nguyen
*Attorney, Agent, or Firm*—Driscoll A. Nina; Bruce J. Wolstoncroft

[57] ABSTRACT

A method of manufacturing a guide plate for use in a chip carrier socket or other electrical connector provides the precision required for close-center line spacing while minimizing the cost associated with production. A block of ceramic or the like is ground to the precise outside dimensions required. Grooves are then cut in the block of ceramic, and the ceramic is then sliced into respective guide plates. The guide plates are inserted into openings provided in the electrical connector an retained therein. The grooves are dimensioned to cooperate with contact pins of the electrical connector to precisely maintain the pins in position, whereby when a chip is positioned in the electrical connector, the pins will be in position to make an electrical connection with the pads of the chip.

8 Claims, 3 Drawing Sheets

METHOD OF MANUFACTURE OF A CONTACT GUIDE

This application is a continuation of application Ser. No. 08/042,962 filed Apr. 5, 1993, now abandoned, in turn, a division of application Ser. No. 07/833,284 filed Feb. 10, 1992, now U.S. Pat. No. 5,252,079 .

FIELD OF THE INVENTION

The invention is directed to a method for the manufacture of high density electrical connectors.

BACKGROUND OF THE INVENTION

Integrated circuit chips are becoming more complex to meet the needs of the consumer. As the complexity of the chips increases, the requirements for reduction of the area of bonding pads and the like, over which transmissions travel, increases. Although the need for bonding pads is increasing, it is not practical to increase the size of the chips, as board real-estate is at a premium. Consequently, in order to meet the requirements of increased number of bonding pads, the size and the spacing between the bonding pads must be minimized (currently center-line spacing for bonding pads has been proposed at 0.003 inches).

As the spacing between bonding pads in minimized, the spacing of the terminals or contact pins which mate thereto must also be minimized in order to facilitate mating. One application in which closely spaced pins are mated to closely spaced bonding pads is shown in co-pending U.S. application Ser. No. 07/786,642 filed Nov. 1, 1991, issued on Oct. 27, 1992 as U.S. Pat. No. 5,158,467. The closely spaced contact pins are positioned and maintained in round holes which extend through a contact guide. This effectively maintains the pins in position and provides the electrical connection required. However, the manufacture of round openings on such close center-line spacing requires the use of expensive, accurate machinery, such as high quality lasers which uniformly distribute energy across the beam cross-section. The expense of such high quality lasers can significantly impact the price of the contact guide and consequently the overall price of the connector.

It would, therefore, be beneficial to utilize a contact guide which is manufactured with less expensive machinery. As the close center-line spacing requires controlled tolerances, it is essential that the method of manufacturing the contact guide maintain the precision required to ensure that the guide cooperates with the contact pins to provide an accurate positioning of the pins.

SUMMARY OF THE INVENTION

As the contacts are required to be spaced closer together, it is important to provide a relatively inexpensive guide plate, and a method of manufacturing the same, for use in an electrical connector which positions and maintains the contacts in position.

One aspect of the invention is, therefore, directed to the manufacture of the guide plate. The manufacture includes the steps of grinding a block of material to the precise dimensions required, cutting grooves in side walls of the block of material, and slicing the grooved block of material into thin members to form the contact guide plate.

Another aspect of the invention relates to the guide plate. The guide plate cooperates with contact pins of the connector to maintain the contact pins in position relative to the pads of the connector. Edge surfaces extend from a first major surface of the guide plate to a second major surface. The edges surfaces have grooves provided therein, the grooves are essentially parallel to each other and extend from the first major surface to the second major surface. Each groove is configured to receive a respective contact pin therein.

The invention is also directed to an electrical connector assembly for electrically connecting a first substrate to a second substrate. The electrical connector has a frame with a plurality of contacts extending therethrough. A guide plate receiving opening is positioned in the frame. End portions of the contacts extend into the guide plate receiving opening. A chip receiving opening is also positioned in the frame, adjacent to the guide plate receiving opening.

A guide plate is provided in the guide plate receiving opening and has grooves provided on edges thereof. Contact pins are positioned in the grooves of the guide plate, and have first ends which electrically engage the contacts and second ends which extend into the chip receiving opening, whereby the grooves cooperate with the contact pins to maintain the contact pins in position to engage the second substrate when the second substrate is inserted into the chip receiving opening.

DETAILED DESCRIPTION OF THE INVENTION

Figure 3:
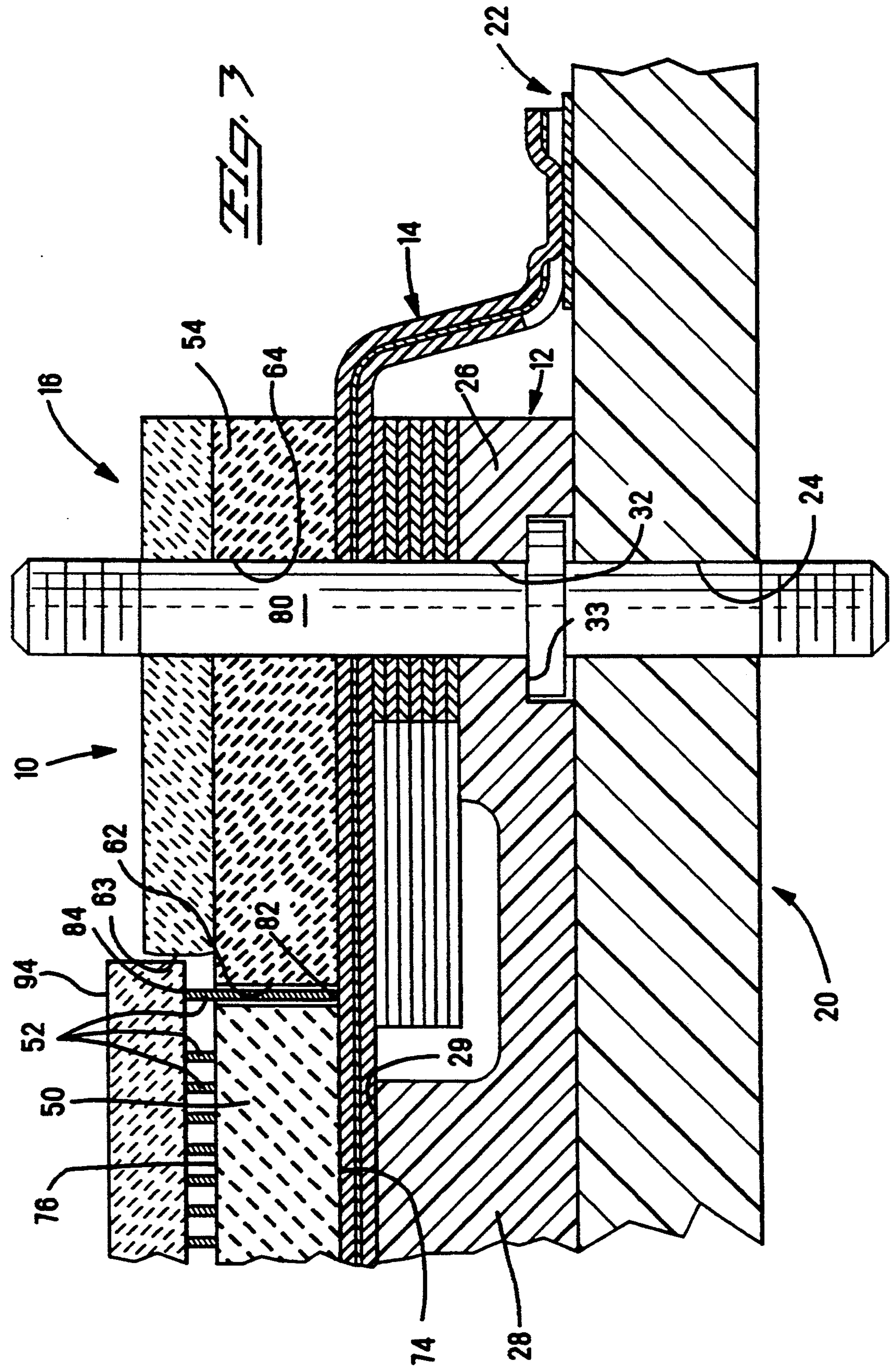
FIG. 3 is a sectioned view of a socket into which a respective guide plate has been inserted.

Referring to FIG. 3, socket 10, for use in burning or testing a chip, includes base section 12, metallized plastic membrane 14, and upper section 16. Socket 10 is shown positioned on substrate 20 with membrane 14 electrically engaging circuit pads 22 thereon. Substrate 20 further includes mounting holes 24. Although membrane 14 is shown extending through socket 10, other types of contacts or the like can be used.

Base section 12 has a base plate 26 formed by molding a dielectric plastic material such as General Electric's VALOX 420 SEO or other suitable material. A support area 28 is integrally attached to plate 26. The support area has a support surface 29 which cooperates with a portion of membrane 14. Mounting holes 32 extend through plate 26 adjacent each corner. Each hole 32 includes shoulder 33.

Upper section 16 comprises a frame 54, contact pins 52, and a contact guide plate 50. Frame 54, preferably made from ceramic or other wear resistant material, is provided with centrally located openings 62, 63 and alignment holes 64 adjacent each corner. Opening 62, positioned below opening 63 (as viewed in FIG. 3), has a smaller cross-sectional area than opening 63. Membrane 14 extends to opening 62.

Figure 2:
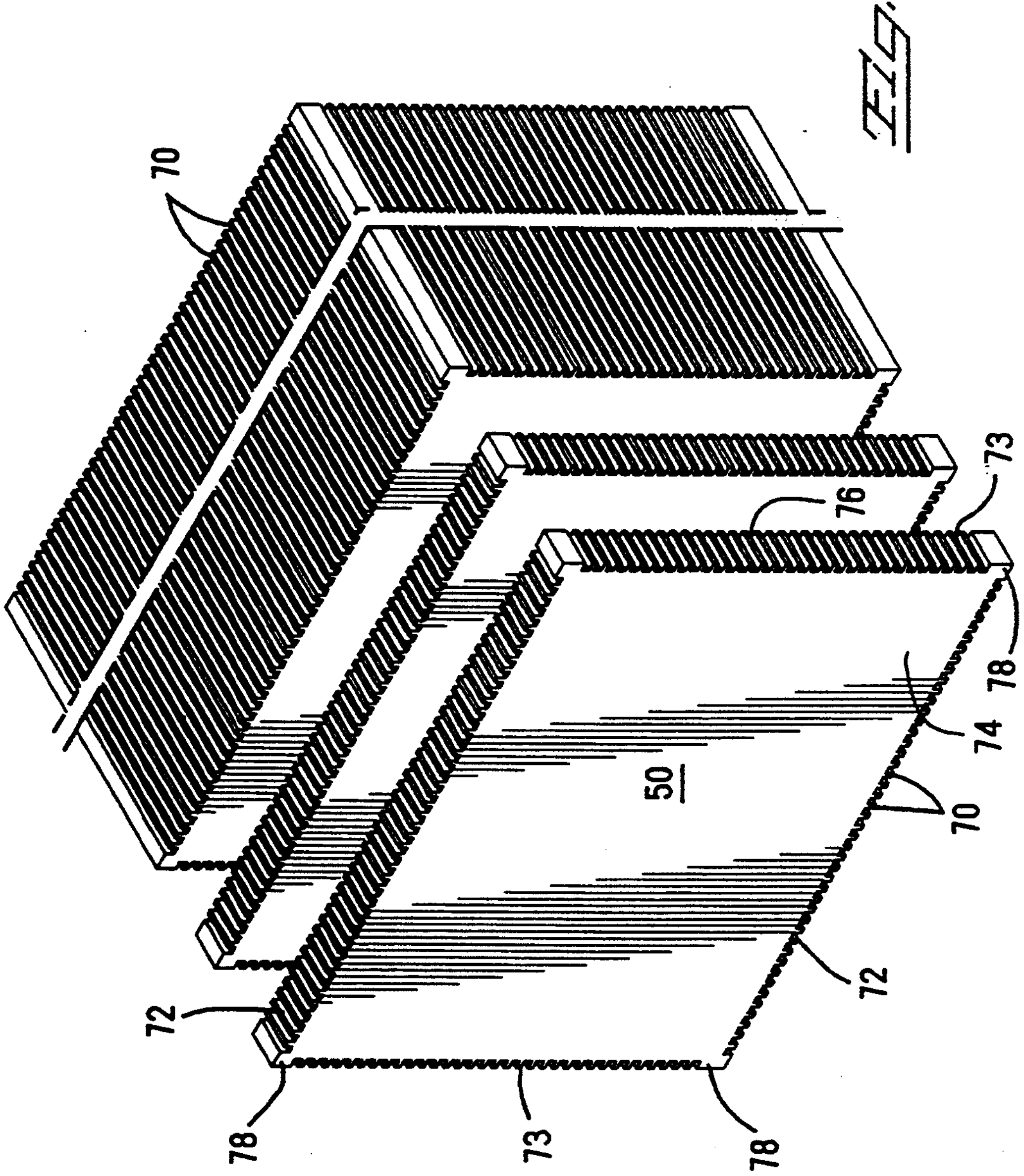
FIG. 2 is a perspective view, similar to that of FIG. 1, of the block of ceramic cut into various contact guide plates.

Contact guide plate 50, as best shown in FIG. 2, is formed from ceramic or similar material. The contact guide plate 50 has grooves 70 provided in the side and end edges surfaces 72, 73 thereof. The grooves 70 extend from a bottom or first major surface 74 (as viewed in FIG. 3) to a top or second major surface 76. The grooves are essentially parallel to each other and are dimensioned according to need; however a typical groove is approximately 0.0025 inches wide and 0.0025 inches deep. The center-line spacing of the grooves can also vary according to need with a typical spacing ranging from 0.005 to 0.003 inches for a socket of this type. As shown in FIG. 2, each corner 78 of the contact guide plate 50 has an area where no grooves are positioned on the edges thereof. These areas can be used to facilitate the interference fit between the guide plate and socket 10, as will be more fully described.

Contact pins 52 are formed from any suitable low resistance conductive material capable of being formed into extremely small sizes, such as Palliney 7 or ORO 28 A sold by J. M. Ney Company of Hartford, Conn. The contact pins of socket 10 have a diameter between 0.002 to 0.001 inches, larger diameter pins can be made if required.

Referring to FIG. 3, socket 10 is held together and secured to substrate 20 with the use of conventional fastening means in conjunction with mounting holes 32, 64. In this regard, socket 10 can be pre-assembled using bolts 80 with threaded shafts at opposite ends and an upset therebetween. The upset engages through socket 10 to receive a nut (not shown) to secure the socket together. Subsequently, socket 10 can be mounted onto substrate 20 by passing the opposite shafts through substrate holes 24 to receive a nut (not shown) and secure socket 10 thereto.

During pre-assembly of the socket, contact guide plate 50 is nested in opening 62 and retained therein. Opening 62 may have slightly smaller dimensions than contact guide plate 50, thereby providing an interference fit between the plate and the sidewalls of the opening when the plate is inserted therein. In the alternative, the contact guide plate may be retained in the opening by bonding or other similar means.

As the contact guide plate 50 is inserted into opening 62, the contact guide plate will engage membrane 14. However, the cooperation of the support area 28 with the membrane 14 prevents the deformation of the membrane.

With the contact guide plate 50 properly positioned in opening 62, the sidewalls of the opening are adjacent to grooves 70. The sidewalls of the opening cooperate with the sidewalls of the grooves to surround the grooves with four sidewalls.

After the guide plate 50 is positioned in opening 62, the contact pins 52 are inserted into the grooves. The pins extend through the guide plate from beyond the bottom surface 74 to beyond the top surface 76. Silicone jelly or the like is provided in the grooves to maintain the pins in the grooves. A first end 82 of each pin is placed in electrical engagement with membrane 14 and a second end 84 extends from contact guide plate 50 into opening 63. The second ends 84 are positioned to make electrical engagement with the pads of the integrated circuit chip 94 when the chip is positioned in opening 63.

As shown in FIG. 3, integrated circuit chip 94 is placed in opening 63 with the bonding pads (not expressly shown) engaging contact pins 52 for testing and burn-in as required. As the pins engage the pads and the membrane, the pins provide the electrical connection required between the chip and the membrane. In order to ensure that a positive electrical connection is effected between the contact pins and the bonding pads, a cover (not shown) cooperates with the chip to exert a force thereon, as is well known in the art.

During the manufacture of sockets of the type described above, it is essential that costs be minimized in order to prevent the price of the socket from being prohibitive. Consequently, a method of manufacture is required which provides the precision necessary for the sockets, while minimizing the cost associated therewith.

Figure 1:
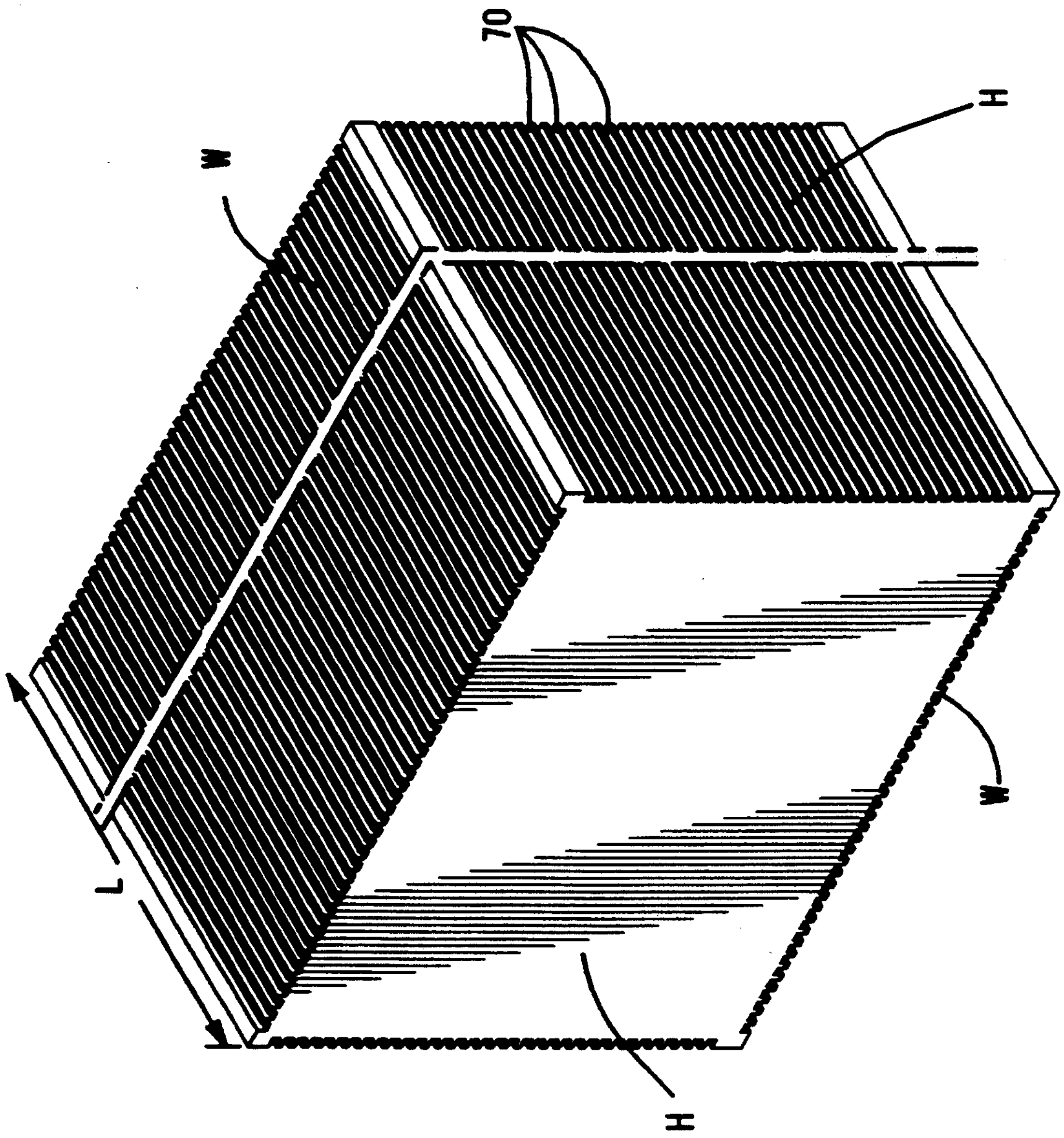
FIG. 1 is a perspective view of a block of ceramic with grooves cut into the side surfaces thereof.

FIGS. 1 and 2 illustrate a method of manufacture of the guide plate 50. This method reduces the cost of manufacture and provides the precision required to be used in instances where close center-line spacing is required.

The contact guide plate 50 is manufactured from a generally rectangular block of ceramic or other suitable material, as shown in FIG. 1. The rectangular block of ceramic is at least 0.020 inches in length L, with a typical block being approximately six inches in length. The block is ground to the required outside dimensions using conventional diamond wheel grinding equipment. The required outside dimensions of side and end walls W, H of the block are identical to the outside dimensions of the side and end surfaces 72, 73 of the contact guide plate 50.

With the block properly ground to the required dimensions, grooves 70 are cut into side and end walls W, H along the entire length thereof. As described above, these grooves are positioned and cut to correspond to the intended configuration of the contact pin pattern. A machine used for sawing silicon wafers into individual chips, commonly referred to as a dicing saw, is used to cut the grooves. As the dicing saws have blades as narrow as 0.0015 inches, the dimensions of the grooves can vary according to need.

After the grooves have been cut, the block is sliced, as shown in FIG. 2. The block is sliced into thin slabs or contact guide plates by a diamond saw. In this operation, the saw cuts the block in a direction which is essentially perpendicular to the longitudinal axis of the block. It should be noted that a thicker blade will generally be used to slice the block than is used to cut the grooves. With the completion of each slicing operation, a respective contact guide plate 50 is formed from the block.

The completed contact guide block is then inserted into opening 62, where the guide block is frictionally maintained in the opening and the grooves cooperate with the pins, as was previously discussed.

Changes in construction will occur to those skilled in the art and various apparently different modifications and embodiments may be made without departing from the scope of the invention. The matter set forth in the foregoing ,description and accompanying drawings is offered by way of illustration only. It is therefore intended that the foregoing description be regarded as illustrative rather than limiting.

I claim:

1. The method of forming a contact guide plate of wear resistant material for positioning contact pins that interconnect first and second substrates sandwiched about the plate where the contact pins are positioned within through holes in the plate; the method comprising the steps of:

creating a frame of wear resistant material having internal sidewalls that define an opening therethrough;

forming a guide plate of wear resistant material to be received within the opening of the frame with grooves across side edges of the guide plate; and inserting the guide plate into the opening of the frame with the side edges of the guide plate abutting the internal sidewalls of the frame such that the grooves of the guide plate extend along the internal sidewalls of the frame;

whereby, the internal sidewalls of the opening of the frame cooperate with the grooves to peripherally surround the grooves, thereby defining through holes within the plate through which the contact pins are positioned.

2. The method as recited in claim 1, wherein the guide plate is formed by:

grinding a block of material to a cross section that is receivable within the opening of the frame and having an extended length;

cutting the groove in the side edges of the block along the extended length; and slicing the block of material transversely to the grooves, whereby a guide plate of the proper size is formed with the groove extending across the side edges of the guide plate.

3. The method as recited in claim 1 wherein the wear resistant material is ceramic.

4. The method as recited in claim 2 wherein a diamond wheel grinding machine grinds the block.

5. The method as recited in claim 2 wherein a dicing saw is used to cut the grooves into the block of material.

6. The method as recited in claim 1 wherein the guide plate is received within the opening of the frame inn an interference fit.

7. The method as recited in claim 1 wherein the grooves are generally rectangular in cross section, whereby a polygonal hole is formed through the plate.

8. The method of forming a contact guide plate of wear resistant material for positioning contact pins that interconnect first and second substrates sandwiched about the plate where the contact pins are positioned within through holes in the plate; the method comprising the steps of:

creating a frame of wear resistant material having an internal sidewall that defines an opening therethrough;

forming a guide plate of wear resistant material to be received within the opening of the frame;

grinding a block of material to a cross section that is receivable within the opening of the frame and having an extended length;

cutting the grooves in the side edges of the block along the extended length; and slicing the block of material transversely to the grooves, inserting the guide plate into the opening of the frame with the side edges of the guide plate abutting the internal sidewalls of the frame and grooves extending along the sidewall of the frame;

whereby, the sidewalls of the opening of the frame cooperate with the grooves to peripherally surround the grooves, thereby defining the through holes within the plate.

* * * * *